United States Patent

Thompson et al.

[15] 3,699,479

[45] Oct. 17, 1972

[54] DIFFERENTIAL PHASE SHIFT KEYING MODULATION SYSTEM

[72] Inventors: Raymond Thompson, Havant; Ashley W. Guest, Waterlooville, both of England

[73] Assignee: The Plessey Company Limited, Ilford, England

[22] Filed: Dec. 7, 1970

[21] Appl. No.: 95,653

[30] Foreign Application Priority Data

Dec. 9, 1969 Great Britain..........59,911/69

[52] U.S. Cl.....................332/16 R, 325/163, 332/22

[51] Int. Cl...............................................H04l 27/20

[58] Field of Search.....332/16, 16 T, 22, 23; 325/30, 325/163; 178/66

[56] References Cited

UNITED STATES PATENTS

| | | | |
|---|---|---|---|
| 2,635,226 | 4/1953 | Harris | 332/22 |
| 3,517,297 | 6/1970 | Durio et al. | 332/22 X |
| 3,341,776 | 9/1967 | Doelz et al. | 325/163 X |
| 3,242,262 | 3/1966 | Melas et al. | 325/30 X |
| 3,517,338 | 6/1970 | Herman et al. | 325/30 X |

*Primary Examiner*—Alfred L. Brody
*Attorney*—Mason, Mason & Albright

[57] ABSTRACT

A differential phase shift keying modulating system is described, comprising two balanced modulators, one fed with a carrier frequency and the other fed with the carrier frequency phase shifted by 90°. Modulating signals, respectively produced by a ring counter driving cosine and sine weighting circuits, are respectively fed to the two balanced modulators. Since the modulator signals have a sine/cosine relationship, the resultant output of the balanced modulators has a constant amplitude and a progressively increasing phase. Data is transmitted by causing the ring counter to count up or down, according to the value of data, so as to alter the direction of phase change of the output vector, and by varying the total number of stepping pulses applied to the counter during a given period, so as to vary the extent of the phase change during that period.

8 Claims, 5 Drawing Figures

INVENTORS
RAYMOND THOMPSON
ASHLEY W. GUEST
BY
Mason, Mason & Albright
ATTORNEYS

INVENTORS
RAYMOND THOMPSON
ASHLEY W. GUEST
BY
Mason, Mason & Albright
ATTORNEYS

INVENTORS
RAYMOND THOMPSON
ASHLEY W. GUEST
BY
Mason, Mason & Albright
ATTORNEYS

INVENTORS
RAYMOND THOMPSON
ASHLEY W. GUEST
BY
Mason, Mason & Albright
ATTORNEYS

DIFFERENTIAL PHASE SHIFT KEYING MODULATION SYSTEM

The invention relates to electrical modulation systems, such as differential phase shift keying (DPSK) systems for example.

Differential phase shift keying modulation systems (that is, systems in which the data transmitted in a given period of time is represented by the phase of a signal during that period of time as compared with the phase of the signal in the immediately preceding period) have been proposed which employ shaped amplitude transitions to restrict the wide spectrum associated with rapid phase changes. This type of waveform may be generated as a combination of two double side band suppressed carrier signals in quadrature. Such a system enables modulation to be accomplished directly at carrier frequency. However, a disadvantage is that the amplitude of the resultant output is not constant, and requires a linear transmitter power amplifier. Such a power amplifier may be wasteful of power, and any non-linearity increases the transmitted spectrum.

An object of the invention, therefore, is to provide an improved modulating system and method which minimizes these disadvantages.

BRIEF SUMMARY OF THE INVENTION

In accordance with the invention, there is provided a modulation system, comprising two balanced modulators, signal producing means operative to produce two modulating signals whose relative amplitudes have a sine/cosine relationship continuously, and means operative to apply each modulating signal to a respective one of the modulators whereby the resultant of the two outputs respectively produced by the modulators, when one modulator is fed to the carrier signal and the other modulator is fed with the carrier signal displaced by 90°, has a constant amplitude and a progressively varying phase.

DETAILED DESCRIPTION INCLUDING BRIEF DESCRIPTION OF THE DRAWINGS

An electrical modulating system embodying the invention and a method according to the invention will now be described, by way of example only, with reference to the accompanying drawings in which.

The system to be described enables data to be transmitted by differential phase shift keying (DPSK), that is, the data transmitted in a particular period of time, referred to as a "symbol period," is represented by the phase of that signal as compared with the phase of the signal in the immediately preceding symbol period.

Figure 1:
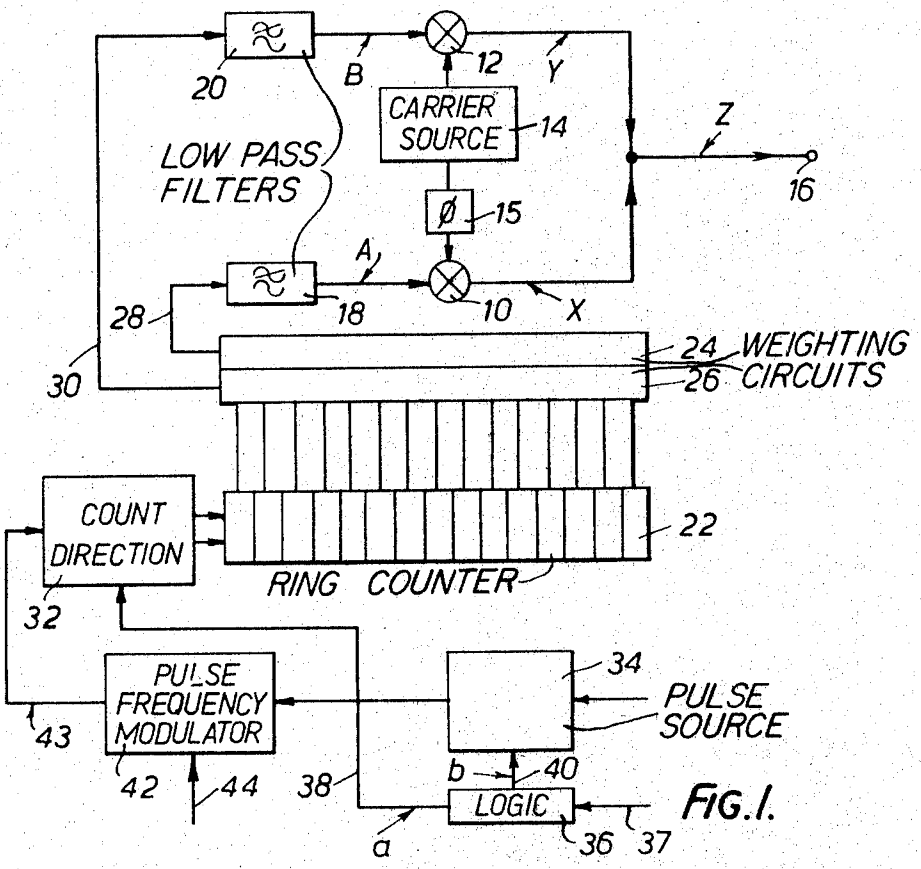
FIG. 1 is a block diagram of one from of the system.

As shown in FIG. 1, the system comprises two balanced modulators 10 and 12. Modulator 12 is fed with a carrier frequency from a source 14, while modulator 10 receives the carrier frequency via a 90° phase shift circuit 15. The outputs X and Y from the modulators 10 and 12 are combined and the resultant is fed to an output terminal 16.

Modulating signals A and B are fed to the modulators 10 and 12 through respective low pass filters 18 and 20. In order to generate the modulating signals A and B, the system of FIG. 1 employs a ring counter 22 having, in this example, 15 binary stages. The outputs of the stages of the counter are fed to sine and cosine weighting circuits 24 and 26 having output lines 28 and 30. The weighting circuits can, for example, comprise respective chains of resistors whose values are related to each other sinusoidally, a constant potential being applied across each chain of resistors. As each stage of the counter is energized, the output line 28, 30 of each weighting circuit is connected to a tapping point between a different pair of resistors. Therefore, as the stages of the counter 22 are successively energized, an output waveform of the type shown in FIG. 2*a* is produced on output line 28. The resistors of the cosine weighting circuit 26 are shifted several stages round the ring relative to the resistors of the sine weighting circuit 24, and therefore the output waveform produced on line 30 has the form shown in FIG. 2*b*. Thus, the amplitudes of the signals on lines 28 and 30 always have a sine/cosine relationship.

The operation of the counter 22 is controlled by two units 32 and 34. Unit 32 determines the direction of counting, while unit 34 is a source of pulses whose frequency and determines the frequency of counting. The units 32 and 34 are in turn controlled by data input means in the form of logic 36 which is responsive to incoming serial data, received on a line 37, to be transmitted by the system. In a manner to be explained in detail below, the logic circuitry 36 responds to the incoming data by producing binary signals $a$ and $b$ on lines 38 and 40 respectively. When $a = 0$, the unit 32 is actuated to cause the counter 22 to count up and when $a = 1$, the unit 32 is actuated to cause the counter 22 to count down. When $b = 0$, the unit 34 is actuated to apply P pulses per second to the counter 22, and when $b - 1$ the unit 34 is actuated to apply 3P pulses per second to the counter 22. The pulses from unit 34 are passed to the counter through a pulse frequency modulator 42 and by a line 43. The pulse frequency modulator is controlled by a modulating signal received on a line 44.

Figure 2:
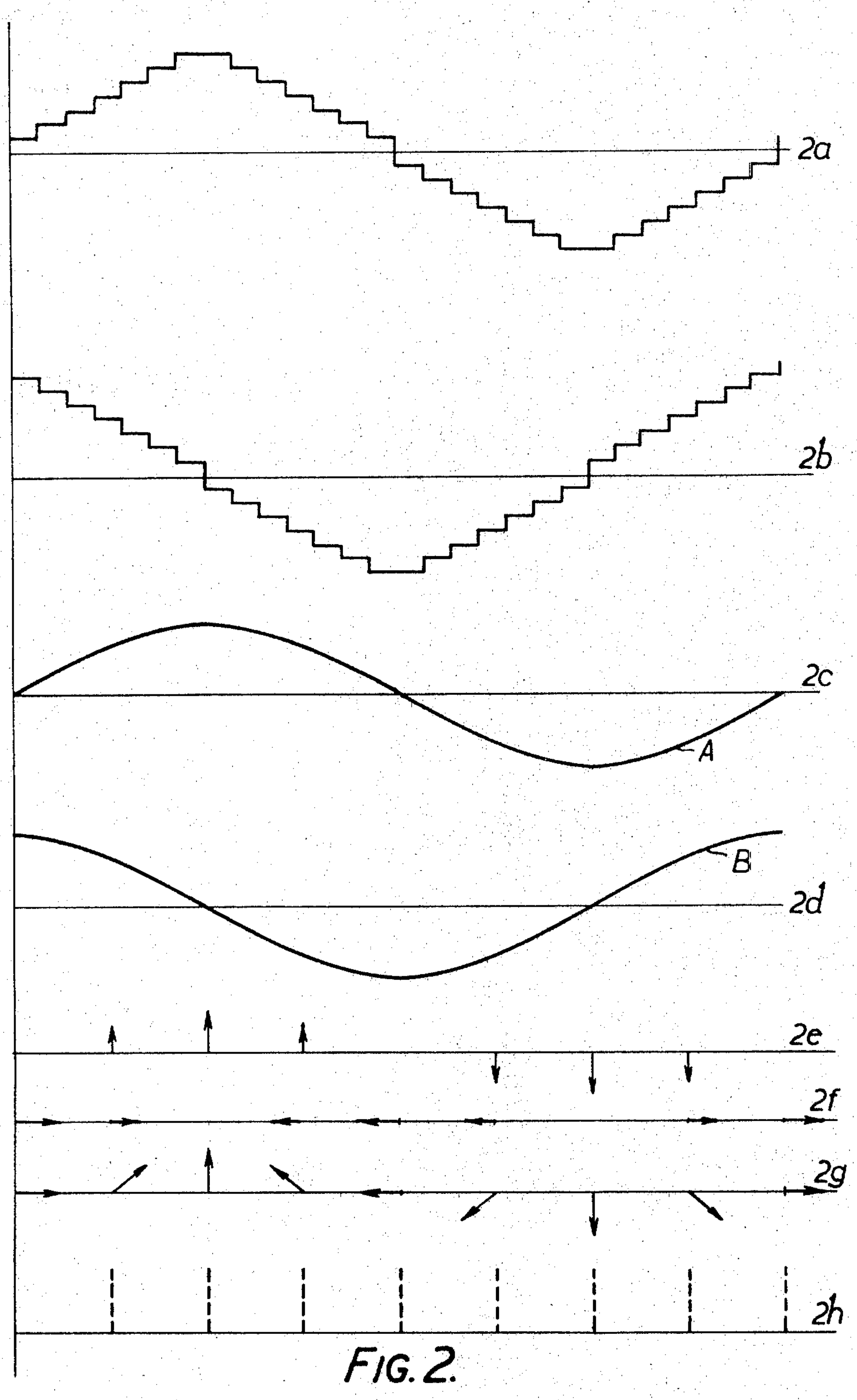
FIG. 2 shows waveforms and vector diagrams for explaining the operation of the system of FIG. 1.

The operation of the system will now be explained with reference to FIG. 2, assuming initially that $a = 0$ and $b = 0$. The pulse frequency modulator 42 will initially be ignored, and it will be assumed that the pulses from unit 34 are passed directly to unit 32.

The action of the filters 18 and 20 is to smooth the waveforms 2*a* and 2*b* so that the signals A and B applied to the modulators 10 and 12 have, approximately, the waveforms shown in FIGS. 2*c* and 2*d*. Since the carrier signals received by the two modulators are 90° out of phase and since the two modulating signals A and B are also 90° out of phase, the action of each modulator 10, 12, is to produce an output vector either in phase or in anti-phase with the carrier signal fed to it. FIG. 2*e* shows, for each quarter-cycle point of the modulating signal A, the vector X produced by the modulator 10. As shown, the vector X is either in phase or in anti-phase with the carrier signal fed to modulator 10 and its amplitude varies according to the amplitude of the modulating signal A. FIG. 2*f* shows, for each quarter-cycle point of the waveform B, the vector Y produced by the modulator 12. Since the modulator 12 receives the carrier frequency 90° out of phase with the carrier signal fed to the modulator 10, the vector Y is displaced by 90° relative to the vector X. Its amplitude varies in accordance with the amplitude of the modulating signal B.

FIG. 2*g* shows the output vector Z produced at the output terminal 16, this vector being the resultant of the vectors X and Y. As shown in FIG. 2*g*, the vector Z continually advances in phase. It will be noted that, because the vectors X and Y are related according to a sine/cosine relationship, the vector Z has a constant amplitude.

FIG. 2*h* shows the lengths of the symbol periods, each of which is equal in length to one eighth of a cycle of the waveforms 2*c* and 2*d*.

It will therefore be seen that when the data is such that $a$ and $b$ are both equal to 0, the output vector Z advances by 45° during each symbol period.

If, now, the incoming data on line 37 changes value so that $b$ becomes 1 ($a$ remaining at 0), the frequency of the signals A and B will treble. Therefore, there will be a 135° phase advance during the next symbol period and during each succeeding symbol period for so long as $a=0$ and $b=1$.

If the incoming data on line 38 changes value again so that $a$ becomes 1, the direction of counting of counter 22 will reverse, that is, there will be a 180° phase shift in the signals A and B and thus in the vectors X and Y; the output vector Z will therefore reverse. Thus there will be a phase retard during each symbol period, this phase retard being 45° or 135° depending on the value of $b$.

Therefore, four different values of data can be transmitted by the system according to the values of $a$ and $b$ as shown in the Table below.

TABLE

| Data Value | Value of $a$ | Value of $b$ |
|---|---|---|
| 1 | 0 | 0 |
| 2 | 0 | 1 |
| 3 | 1 | 1 |
| 4 | 1 | 0 |

FIG. 3*a* shows how a phase transition takes place over a symbol period during which both $a$ and $b$ are equal to 0, and FIG. 3*b* shows a similar phase transition when $a=0$ and $b=1$. As shown, these phase transitions are linear. However, in order to reduce the bandwidth required for the system, it may be desirable to have a non-linear phase transition over each symbol period. FIG. 3*c* shows, by the full line, a desirable shape for a phase transition. In order to approximate to this desirable phase transition curve, the pulse frequency modulator unit 42 can be used. If the unit 42 is controlled, by means not shown, so that the counting pulses occur relatively slowly at the beginning and end of each symbol period and relatively more rapidly during the middle portion thereof, a phase transition of the form shown by the dotted line in FIG. 3*c* can be obtained. This approximates to the required phase transition shown by the full line, and gives improved bandwidth characteristics for the system. It should be noted that the total number of counting pulses fed to the counter 22 during the symbol period is the same as the number fed for a linear phase transition; the modulator 42 merely varies their rate over the symbol period.

Instead of using only two different pulse occurrence rates during a symbol period as shown by the dotted line in FIG. 3*c*, a closer approximation to the full line can be obtained by using a greater number of pulse occurrence rates. For example, the pulse occurrence rate could be varied sinusoidally during the symbol period. Thus a ring counter and a sine weighting circuit similar to the counter 22 and the circuit 24 could be used to produce the signal line 44. Instead, or in addition, an improved result could be obtained by comparing the waveform of the pulse frequency modulating signal on line 44 with a reference waveform and correcting it accordingly.

Figure 3:
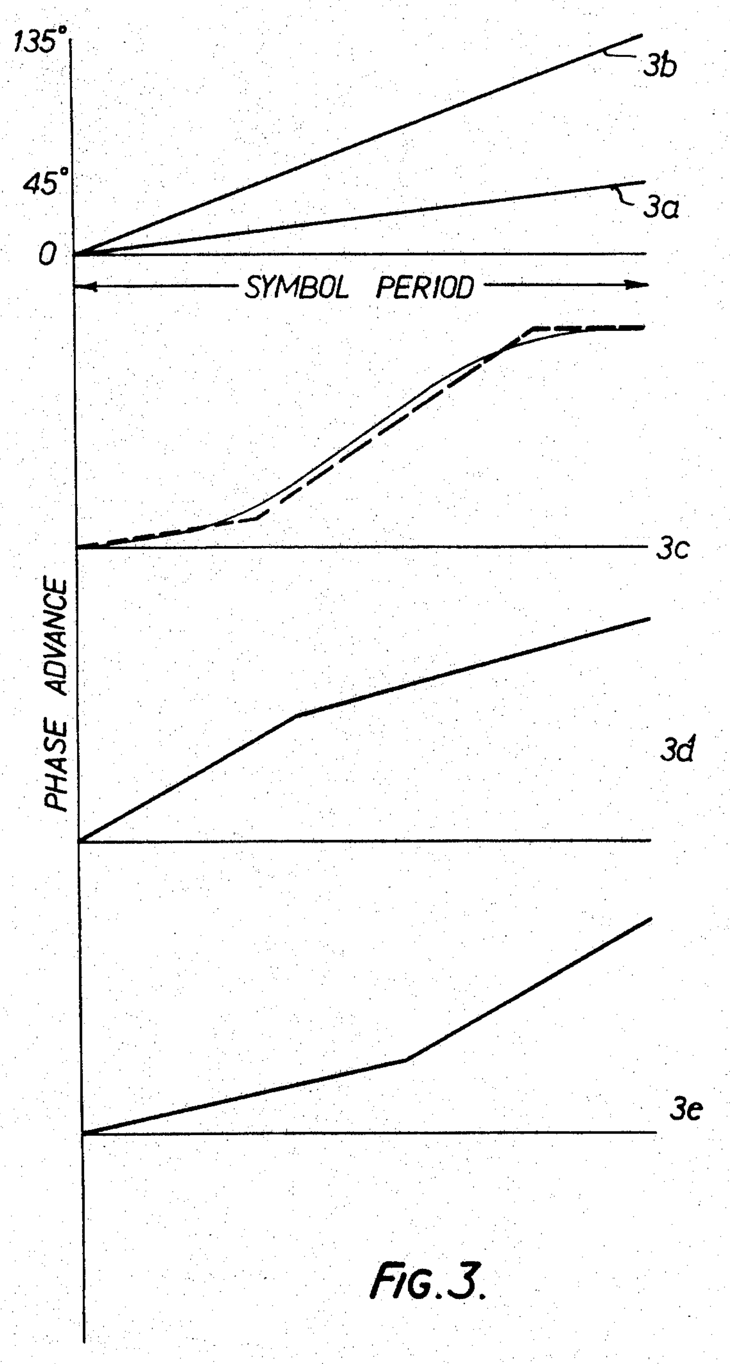
FIG. 3 illustrates how the operation of the system of FIG. 1 can be modified.

The pulse frequency modulator 42 may, instead of being used to improve the shape of the phase transitions, be used to transmit additional data, that is, data additional to that received on line 37. In this application, the pulse frequency modulating signal on line 44 would be arranged to change in response to the additional data to be transmitted so as to give the phase transition a particular shape according to the value of the additional data. FIGS. 3*d* and 3*e* show two different phase transition shapes each of which could represent different values of the additional data. The additional data represented by the phase transition shown in FIG. 3*d* would be transmitted by arranging the modulating signal on line 44 to cause a rapid initial rate of occurrence of counting pulses followed by a slower pulse occurrence rate. In order to achieve the phase transition shown in FIG. 3, the modulating signal on line 44 would cause a slow initial pulse occurrence rate followed by a more rapid one. Again, the total number of counting pulses fed to the counter during the symbol period would be unchanged by the modulating signal on line 44: only the rate of occurrence of the pulses would be varied. At the receiver, suitable detecting means would be provided for, firstly, detecting the total change of phase during each symbol period as compared with the phase at the end of the preceding symbol period (so as to re-produce the data arriving on line 37) and, secondly, to detect the shape of the phase transition during each symbol period so as to re-produce the additional data controlling the signal on line 44.

Figure 4:
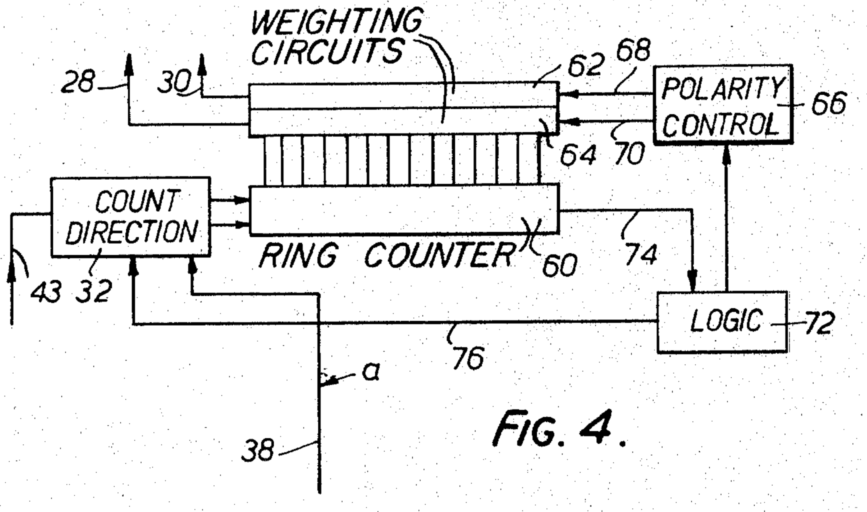
FIG. 4 shows a modified form of the system of FIG. 1.

FIG. 4 shows how part of the system of FIG. 1 may be modified. In FIG. 4, items corresponding to those in FIG. 1 are similarly referenced. The filters and modulators, and the units 34, 36 and 42 have been omitted from the Figure.

In the system of FIG. 4, the ring counter 22 is replaced by a ring counter 60 which can have a smaller number of stages than the ring counter 22. The stages of the counter 60 are connected to respective sine and cosine weighting circuits 62 and 64, and a unit 66 is provided which, by means of control lines 68 and 70, determines the polarity of the constant voltage signal applied across the weighting circuits. The polarity control unit 66 is controlled in turn by logic circuitry 72 which receives a signal on a line 74 each time the counter 60 has counted through all its stages. The weighting circuits 62, 64 are designed so that each synthesizes only one quarter of a waveform.

In addition to controlling the polarity control unit 66, the logic circuit 72 also controls the control unit 32 by means of a line 76.

Figure 5:
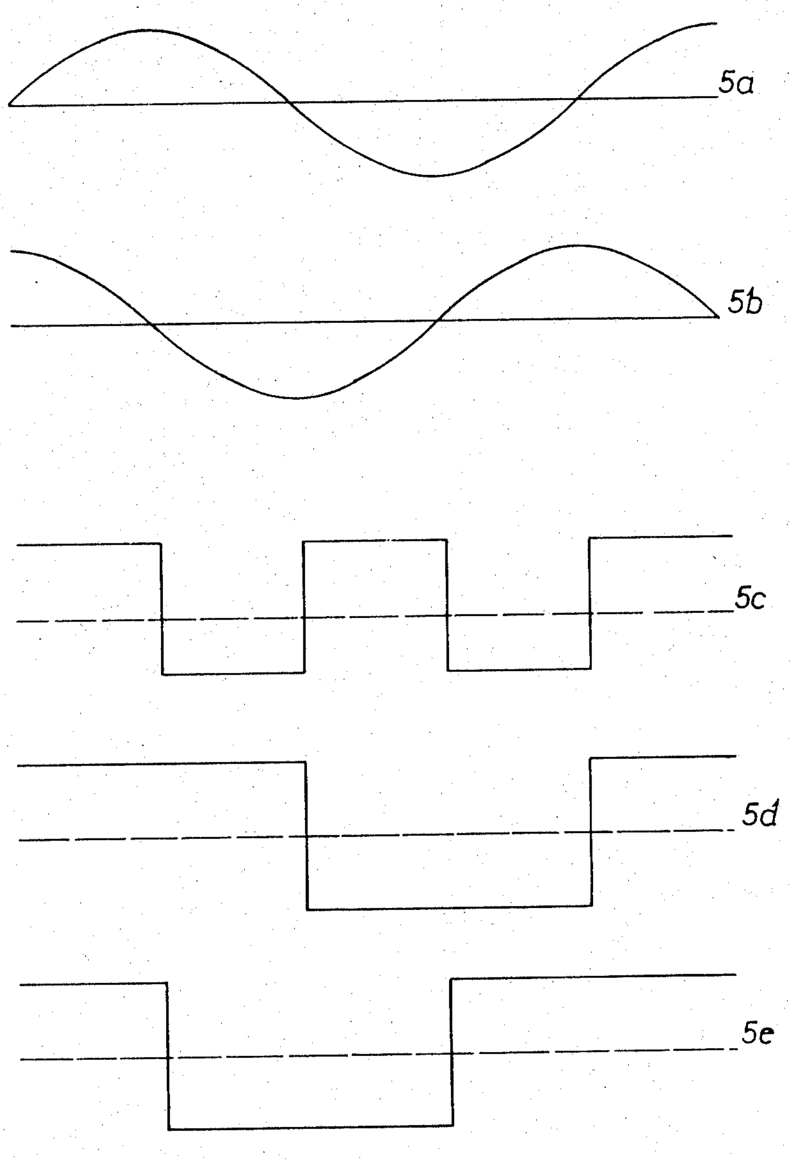
FIG. 5 shows waveforms explaining the operation of the modified system of FIG. 4.

FIG. 5 explains the operation of the system of FIG. 4. FIGS. 5*a* and 5*b* show the waveforms to be synthesized for the signals A and B (the individual steps in the waveforms having been omitted).

FIG. 5*c* shows the waveform of the control signal produced on line 76. When this signal is positive, the counter 60 is caused to count up, and when the signal is negative the counter is caused to count down. FIGS. 5*d* and 5*e* show the polarities of the constant voltages respectively applied to the weighting circuits 62 and 64 by the control lines 68 and 70 respectively.

From FIG. 5*c*, it will be seen that the direction of counting of the counter 60 is reversed every quarter cycle by the logic circuitry 72. The polarity applied to the sine weighting circuit 62 is reversed every half cycle of the waveform A, while the polarity applied to the cosine weighting circuit 64 is reversed every half cycle of the waveform B. In this way, the counter 60, in combination with the weighting circuits 62 and 64, is caused to synthesize the required waveforms A and B similarly to the counter 22 and the weighting circuits 24 and 26 of FIG. 1, but with the advantage that the number of stages of the counter 60 need be only a quarter of the number in the counter 22. It will be noted that the unit 32 is, in addition to being controlled by the logic circuitry 72, also controlled by the unit 36 as before.

The systems described may be modified to transmit more (or less) than the four different types of data shown in the Table above. Thus, for example, the number of different types of data transmitted can be increased by increasing the number of different possible values for the pulse occurrence rates applied to the counters 22 and 60.

By using two double sideband suppressed carrier signals in quadrature, the systems described enable modulation to be accomplished directly at carrier frequency. In addition, however, the systems described ensure that the amplitude of the vector Z is always constant; in this way, they avoid the need, which may arise in systems in which the amplitude of the output vector is not constant, of following the modulators by a linear power amplifier: such a power amplifier is wasteful of power and any non-linearity increases the transmitted spectrum. Since the amplitude of the output vector Z in the systems described is constant, linearity of transmitter power amplifier is not important.

We claim:

1. A differential phase shift keying modulation system for data transmission, comprising two balanced modulators, a continuously recirculatable digital counter having a plurality of stages, two weighting circuits each having a plurality of separately energizable input terminals and an output terminal at which is produced a succession of sinusoidally related amplitudes when the input terminals are energized in sequence, a pulse source operative to apply pulses to the counter to cause the counter to step, data input means responsive to the value of data to be transmitted to control the application of the said pulses to the counter, means so connecting the stages of the counter to the input terminals of the weighting circuits that two modulating signals the relative amplitudes of which have a sine/cosine relationship continuously are respectively synthesized at the output terminals of the weighting circuits in dependence on the said data, carrier signal source means connected to feed one of the modulators with a carrier signal and the other of the modulators with the carrier signal displaced by 90°, and means operative to apply each modulating signal to a respective one of the modulators whereby the resultant of the two outputs respectively produced by the modulators has a constant amplitude and a phase whose value during any particular one of a succession of predetermined periods of time, relative to its preceding value, is dependent on the value of the data.

2. A system according to claim 1, in which the data input means comprises means responsive to data having at least two possible values and connected to the said pulse source to give the said pulses one average frequency when the data has one value and another average frequency when the data has the other value so that the total phase change of the said resultant over a said predetermined period of time is dependent on the value of the data.

3. A system according to claim 1, in which the data input means comprises count direction control means connected to the said counter and operative to control the direction of count and means responsive to data having at least two possible values and connected to the count direction control means whereby to cause the counter to count in one direction when the data has one value and to count in the opposite direction when the data has the other value, whereby to apply a substantially instantaneous 180° phase shift to both modulating signals when the data changes from one value to the other so that the direction of phase change of the said resultant depends on the value of the data.

4. A system according to claim 1, including low pass filters respectively connected to feed the synthesized modulating signals to the modulators.

5. A system according to claim 1, in which the weighting circuits are arranged that the counter completes one cycle of counting for each sinusoidal cycle of the modulating signals.

6. A system according to claim 1, in which each weighting circuit is arranged such as to produce a predetermined fraction of one sinusoidal cycle of the respective modulating signal in response to a complete counting cycle of the counter, which fraction is a mirror image of the next following fraction of equal length, the system including count direction control means connected to the counter to control its direction of counting, polarity control means connected to the weighting circuits to control the instantaneous polarities of the modulating signals which they synthesize, and programmed control means connected to the count direction control means and to the polarity control means and operative to cause the count direction control means to reverse the direction of counting of the counter and to cause the polarity control means to reverse the polarities of the synthesized modulating signals at such instants in each cycle of the modulating signals that the weighting circuits produce modulating signals having the required sine/cosine relationship.

7. A system according to claim 1, including further control means connected to the pulse source and operative to vary the rate at which the said pulses are applied to the counter, without altering the total number of pulses applied during a said predetermined period of time, whereby to vary the rate of phase change of the said resultant during that period of time.

8. A system according to claim 7, in which the further control means comprises pulse frequency modulating means connected to frequency-modulate the pulses produced by the pulse source in dependence on further data to be transmitted.

* * * * *